United States Patent [19]
Kalkunte

[11] Patent Number: 6,009,104
[45] Date of Patent: Dec. 28, 1999

[54] APPARATUS AND METHOD FOR SELECTIVELY MODULATING INTERPACKET GAP INTERVAL FOLLOWING A COLLISION TO AVOID CAPTURE EFFECT

[75] Inventor: Mohan V. Kalkunte, Sunnyvale, Calif.

[73] Assignee: Advanced Micro Devices, Inc., Sunnyvale, Calif.

[21] Appl. No.: 08/884,556

[22] Filed: Jun. 27, 1997

[51] Int. Cl.[6] ............................................. H04L 12/413
[52] U.S. Cl. ........................................ 370/448; 370/445
[58] Field of Search ................................ 370/389, 448, 370/445, 450, 451, 453, 458, 229, 230, 235, 404, 465, 459, 461, 462, 447, 449, 452, 454, 455

[56] References Cited

U.S. PATENT DOCUMENTS

| | | | |
|---|---|---|---|
| 4,649,548 | 3/1987 | Crane | 375/219 |
| 5,339,316 | 8/1994 | Diepstraten | 370/401 |
| 5,404,353 | 4/1995 | Ben-Michael et al. | 370/235 |
| 5,418,784 | 5/1995 | Ramakrishnan et al. | 370/445 |
| 5,422,887 | 6/1995 | Diepstraten et al. | 370/448 |
| 5,436,903 | 7/1995 | Yang et al. | 370/447 |
| 5,548,796 | 8/1996 | Ketchum | 370/447 |
| 5,568,469 | 10/1996 | Sherer et al. | 370/238 |
| 5,600,651 | 2/1997 | Molle | 370/448 |
| 5,642,360 | 6/1997 | Trainin | 370/465 |
| 5,774,658 | 6/1998 | Kalkunte et al. | 395/200.6 |
| 5,784,375 | 7/1998 | Kalkunte et al. | 370/448 |
| 5,870,398 | 2/1999 | Kotchey | 370/445 |

OTHER PUBLICATIONS

Ramakrishnan, K.K. et al., "The Ethernet Capture Effect: Analysis and Solution," Proceedings of 19th Conference on Local Computer Networks, Oct. 2–5, 1994.

Seifert, R., "The Effect of Ethernet Behavior on Networks Using High–Performance Workstations and Servers," Technical Report, Networks and Communications Consulting, Mar. 3, 1995.

Digital Equipment Corporation, Product Data Sheet for DECchip 21040 Ethernet LAN Controller for PCI (Order No. EC–N0280–72), Apr. 1994.

Digital Equipment Corporation, Product Data Sheet for Digital Semiconductor 21140A PCI Fast Ethernet LAN Controller, (Order No. EC–QN7PE–TE), Nov. 1996.

AMD, AM79C970 PCnet™–PCI Single–Chip Ethernet Controller for Ethernet Local Bus, Jun. 1994, pp. 1–868—1–1033.

*Primary Examiner*—Dang Ton
*Assistant Examiner*—Phirin Sam

[57] ABSTRACT

An arrangement for avoiding the capture effect in a half-duplex shared network modifies an interpacket gap timer following collision mediation to ensure a station having transmitted a consecutive number of packets defers to another network station, regardless of the outcome of the collision mediation. If a network having transmitted consecutive packets encounters a collision, the network station selectively modifies the interpacket gap interval based on the selected number of slot times during collision mediation. If the networks station selects zero slot times according to the truncated binary exponential backoff (TBEB) algorithm, the network station increases the interpacket gap by two slot times. If the network station selects one slot time during TBEB collision mediation, the interpacket gap is increased from the minimum IPG by one slot time. Hence, a station having transmitted consecutive packets will always defer to another network station following a collision, regardless of the number of slot times selected during collision mediation.

16 Claims, 4 Drawing Sheets

APPARATUS AND METHOD FOR SELECTIVELY MODULATING INTERPACKET GAP INTERVAL FOLLOWING A COLLISION TO AVOID CAPTURE EFFECT

BACKGROUND OF THE INVENTION

1. Technical Field

The present invention relates to network interfacing and, more particularly, to methods and systems for transmitting data packets in a half-duplex network susceptible to capture effect.

2. Background Art

Local area networks use a network cable or other media to link stations on the network. Each local area network architecture uses a media access control (MAC) enabling a network interface card at each station to share access to the media.

The Ethernet protocol ISO/IEC 8802-3) (ANSI/IEEE Std. 802.3), 1993) edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting, a predetermined transmission delay interval after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet network stations mediate collisions using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts ) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of slot times from the range of zero to $2^j-1$. For example, if the number of attempts j=3, then the range of randomly selected number of slot times is [0,7]; if the randomly-selected number of slot times is four, then the collision backoff interval will be equal to four slot time intervals. According, to Ethernet protocol, the maximum range of randomly selected slot times is $2^{10}-1$.

The truncated binary exponential algorithm has the disadvantage that the range of randomly selected slot times [0, $2^j-1$] increases exponentially each time a specific station loses a retry attempt after collision, resulting in a higher probability of losing the next collision mediation by randomly selecting a larger integer multiple of slot times. Thus, a new station that has data to transmit has a higher probability of winning, a collision mediation than the station having, a greater number of attempts. This effect is known as the capture effect, where a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot be supported on half-duplex networks.

The capture effect also may occur between network stations having different capabilities in counting the transmission delay interval before attempting access of the media. Ethernet protocol specifies the transmission delay interval after sensed deassertion of the receive carrier, i.e., the interpacket gap (IPG) interval, as having a minimum value before stations can attempt access of the media. Network stations (i.e., network nodes) that are capable of minimizing, the transmission delay to the IPG interval, referred to as "fast nodes" or "dominant stations," will begin to transmit before stations incapable of achieving the minimum IPG interval, referred to as "slow nodes." In other words, hardware limitations may prevent the slow nodes from accessing the media within the time interval defined by the IPG interval. Hence, dominant network stations will tend to capture the media over slower nodes that wait a longer time before attempting access of the media. These slower nodes encounter a surrender effect, in which they "surrender" their access to the media due to hardware limitations. The surrender effect may create substantial throughput problems in transmission protocols requiring a sender to receive an acknowledgement within a prescribed interval after a burst transmission.

Hence, capture effect may be caused by a station encountering, a large number of collisions, variance in IPG access times between fast and slow nodes, and variations in propagation delay due to network topology. The capture effect thus causes a large variance in the network access latency, and a corresponding large variance in end to end delays experienced by data packets.

One proposed solution is described in Ramakrishman et al., "The Ethernet Capture Effect: Analysis and Solution," IEEE Local Computer Networks (LCN) Conference, Minneapolis, Minn., October 1994, pages 228–240. The proposed solution by Ramakrishman, referred to as capture avoidance binary exponential backoff (CABEB), uses the standard binary exponential backoff with enhancements for collision resolution in a special case when a station attempts to capture the channel subsequent to an uninterrupted consecutive transmit period.

The CABEB algorithm modifies the truncated binary exponential backoff algorithm based on the premise that there can be no more than one station in an uninterrupted consecutive transmit state at any given time on a CSMA/CD local area network. The CABEB algorithm calculates the collision backoff interval for an uninterrupted consecutive transmission as follows: if the number of collision attempts equals 1, then the collision backoff interval equals two (2) slot time intervals; if the number of collisions equals 2, then the collision backoff interval equals zero (0) slot times; and if the number of collision attempts is greater than 2, then the conventional TBEB algorithm is followed.

Although the CABEB algorithm reduces the capture effect, implementation of the CABEB algorithm in small networks, such as a 2-station or 3-station Ethernet network, substantially increases the collision rate. The CABEB algorithm also reduces the network throughput, especially for small packets.

Another proposed media access mechanism, referred to as the Binary Logarithmic Access Method (BLAM), are described by the IEEE 802.3 w Working Group Draft, "Enhanced Media Access Control Algorithm for IEEE 802.3 CSMA/CD." However, BLAM requires substantial changes to the MAC, and has not been proven effective in a mixed environment having stations employing BLAM nodes and TBEB nodes.

DISCLOSURE OF THE INVENTION

There is a need for a method of accessing the media of an Ethernet network that increases the throughput of the Ethernet network under heavy traffic loads.

There is also a need for a method of accessing media of an Ethernet network that minimizes the occurrence of the capture effect.

There is also a need for an arrangement for accessing the media of a half-duplex shared network that minimizes the number of collisions.

There is also a need for an arrangement for accessing the media of a half-duplex shared network that minimizes the capture effect without affecting collision rate or throughput of small packets.

These and other needs are attained by the present invention, where a network station having transmitted consecutive packets extends the interpacket gap interval following, collision mediation to ensure that another station successfully gains access to the medium.

According, to one aspect of the present invention, a method of accessing, network media by a network station includes transmitting a first data packet on the network media, following transmitting of the first data packet, attempting transmission of a second data packet as a consecutive transmission, sensing a collision on the network media during the attempted transmission of the second data packet, randomly waiting, one of zero and one slot times as a collision backoff interval, and waiting, a modified interpacket gap interval following, the collision backoff interval, the modified interpacket gap interval based on the collision backoff interval and causing a total delay following the sensed collision of at least two slot times. Waiting the modified interpacket gap interval ensures that another network station contending for access of the media successfully gains access regardless of the outcome during collision mediation. Moreover, modifying the interpacket gap interval following the collision backoff interval, instead of modifying the collision backoff interval (e.g., according to the CABEB algorithm) minimizes the number of repeated collisions and idle time on the network media because the network station monitors the media during the modified interpacket gap interval, enabling other network stations to transmit successfully without encountering another collision.

Another aspect of the present invention provides a network interface comprising a carrier and collision sensor configured for sensing a carrier signal and a collision signal, a collision timer configured for selectively counting, one of zero and one slot times as a collision delay interval in response to the sensed collision signal, at least one interframe spacing, timer for counting, an interframe spacing of at least a minimum interpacket gap interval following one of deassertion of the carrier signal and expiration of the collision timer, and a media access controller configured for attempting access of the media following expiration of the interframe spacing timer, the media access device setting the interframe spacing to at least the minimum interpacket gap interval plus a slot time in response to the collision timer selecting one slot time in response to a collision of a second data packet transmitted consecutively after a first data packet by the media access device. The media access controller ensures that the interframe spacing timer is extended in response to a collision encountered during a consecutive transmission, ensuring, that the network station will defer to the other nodes contending for access after the encountered collision. Hence, the disclosed arrangement minimizes the number of collisions following consecutive transmission, improving network throughput, especially for relatively small data packets. This arrangement optimizes throughput in a two-station network, and networks employing point-to-point communication (e.g., communications between half-duplex switched port and network stations).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTIONS

Figure 1:
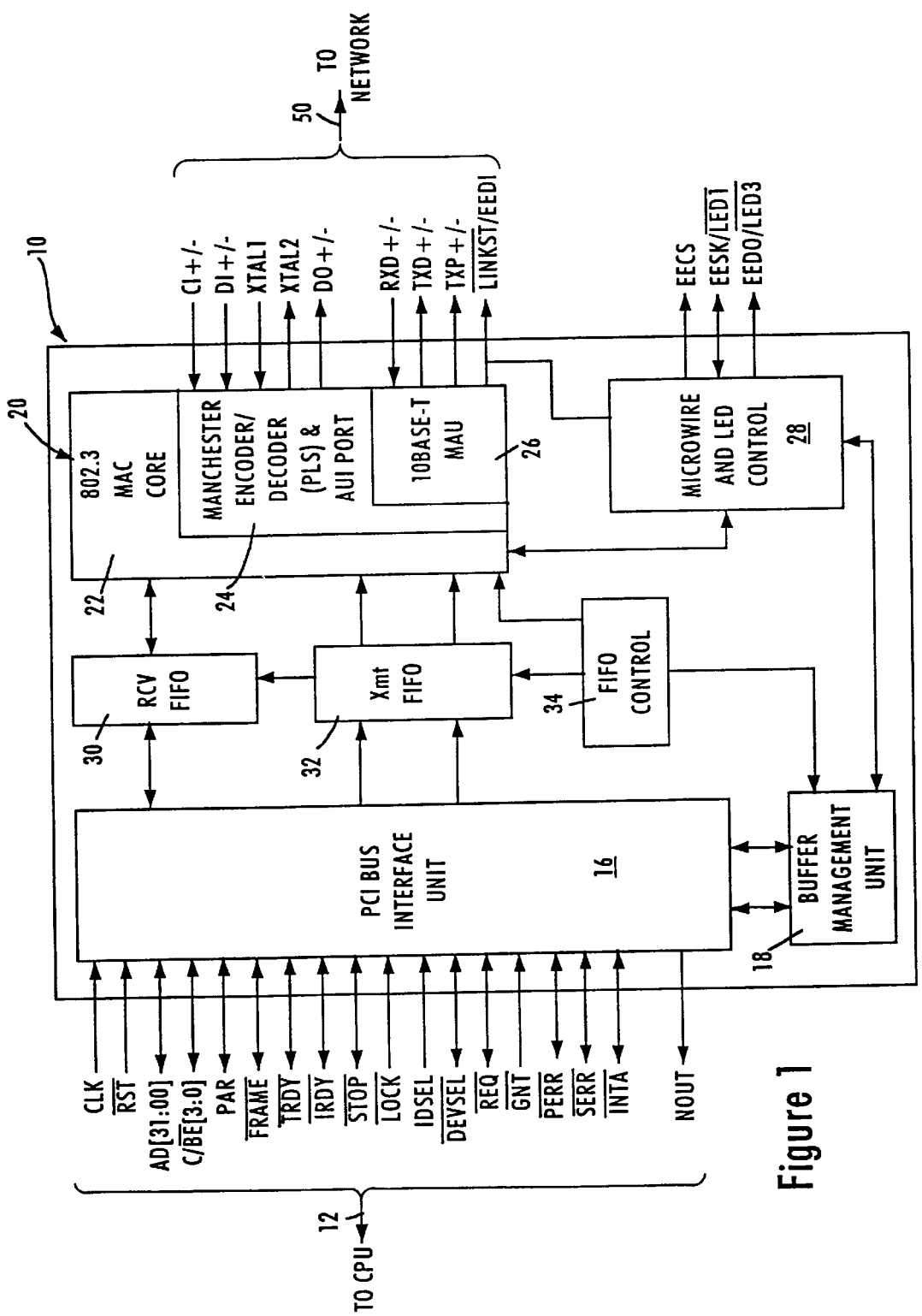
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1–868 to 1–1033 of the AMD Ethernet/IEEE 802.3 Family 1994 World Network Data Book/Handbook.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10 BASE-T MAU) 26. The AUI port 24 follows the specification ISO/IEC 8802-3) (IEEE-ANSI 802.3). The interface 10 also includes a Microwire™ EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer via the PCI bus 12. The PCI bus interface unit 16, under the control of the DMA buffer management unit 18, receives transfers from the host computer memory via the PCI bus 12. The data received from the PCI bus interface unit 16 are transferred to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying, the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are drive with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10 BASE-T port differential receivers (RXD+/−) and 10 BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 detects a collision by the CI inputs, and the MAU 26 detects a collision by sensing activity on both twisted pair signals RXD and TXD. Additional functions of the MAC 20 are described below.

The media 50 may be either coaxial, fiber optic, or twisted pair wire, and hence may couple the interface 10 to 10 BASE-T, 10 BASE-2, 100 BASE-TX, 100 BASE-T4, or 100 BASE-FX networks. The network may operate at 10 megabits per second (10 Mbits/s), 100 megabits per second (100 Mbits/s), or 1000 megabits per second (1000 Mbits/s).

Figure 2A:
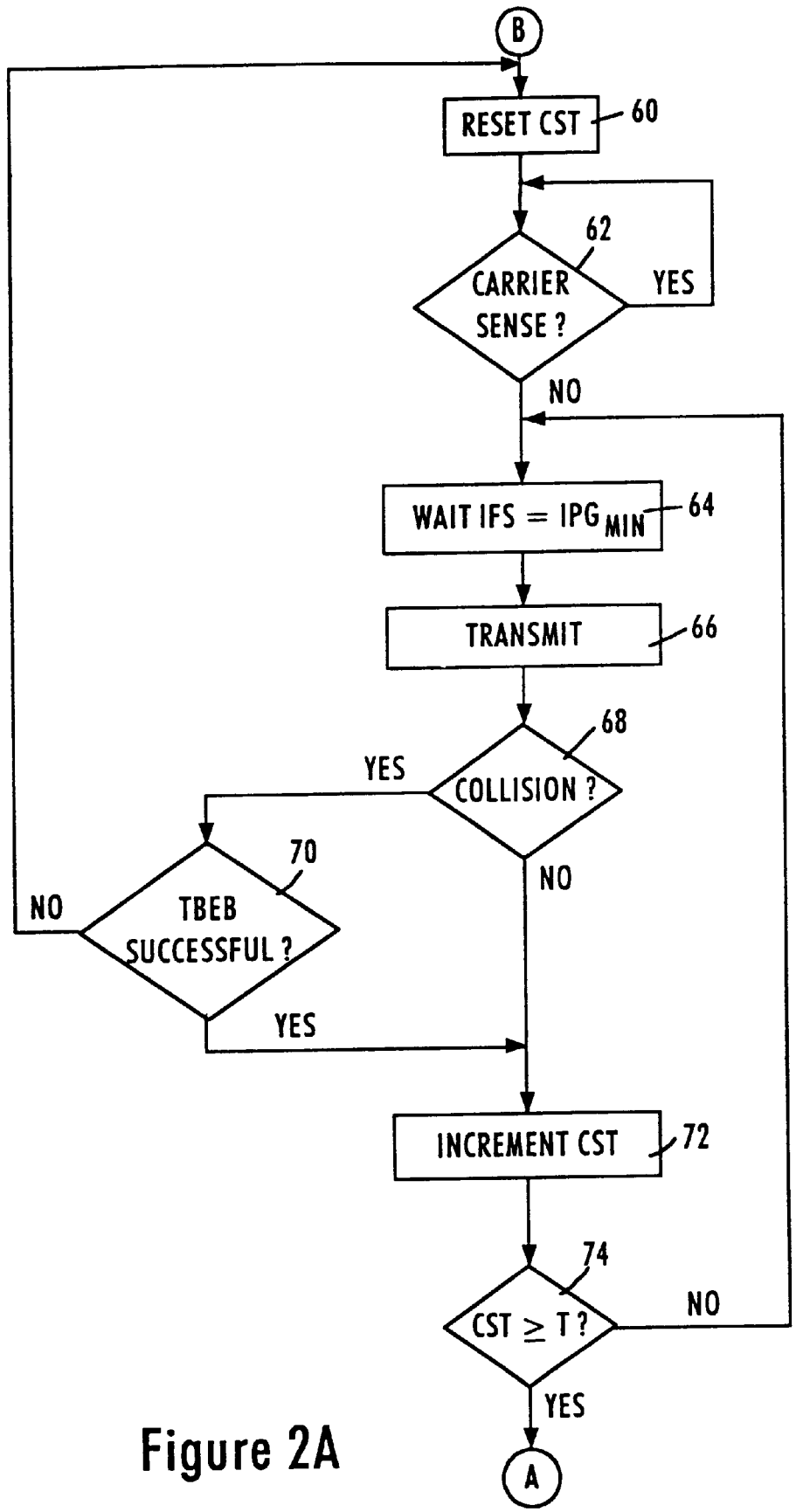
FIGS. 2A and 2B are flow diagrams summarizing a method of accessing media of the network according to an embodiment of the present invention.
Figure 2B:
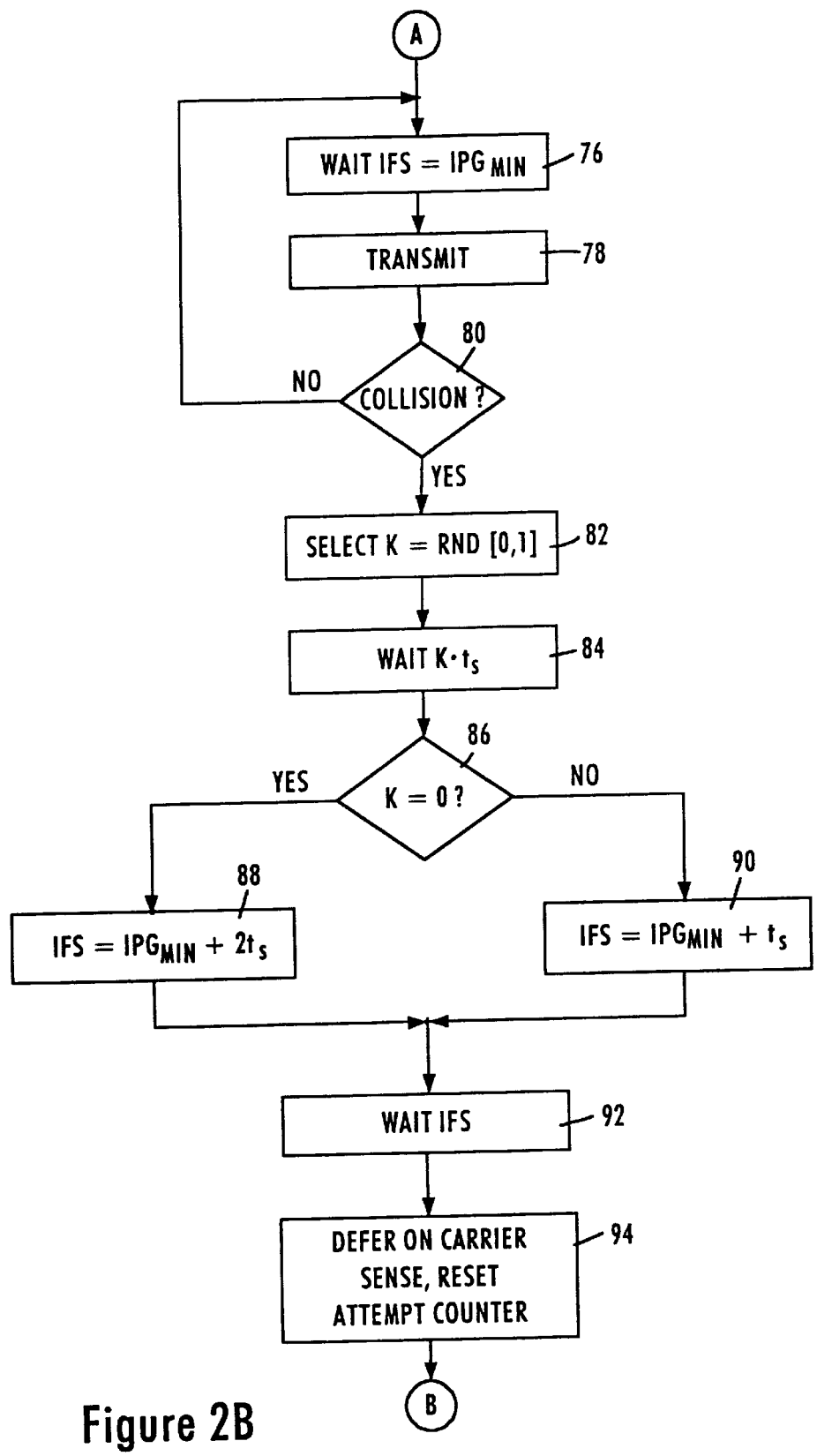
Figure 3:
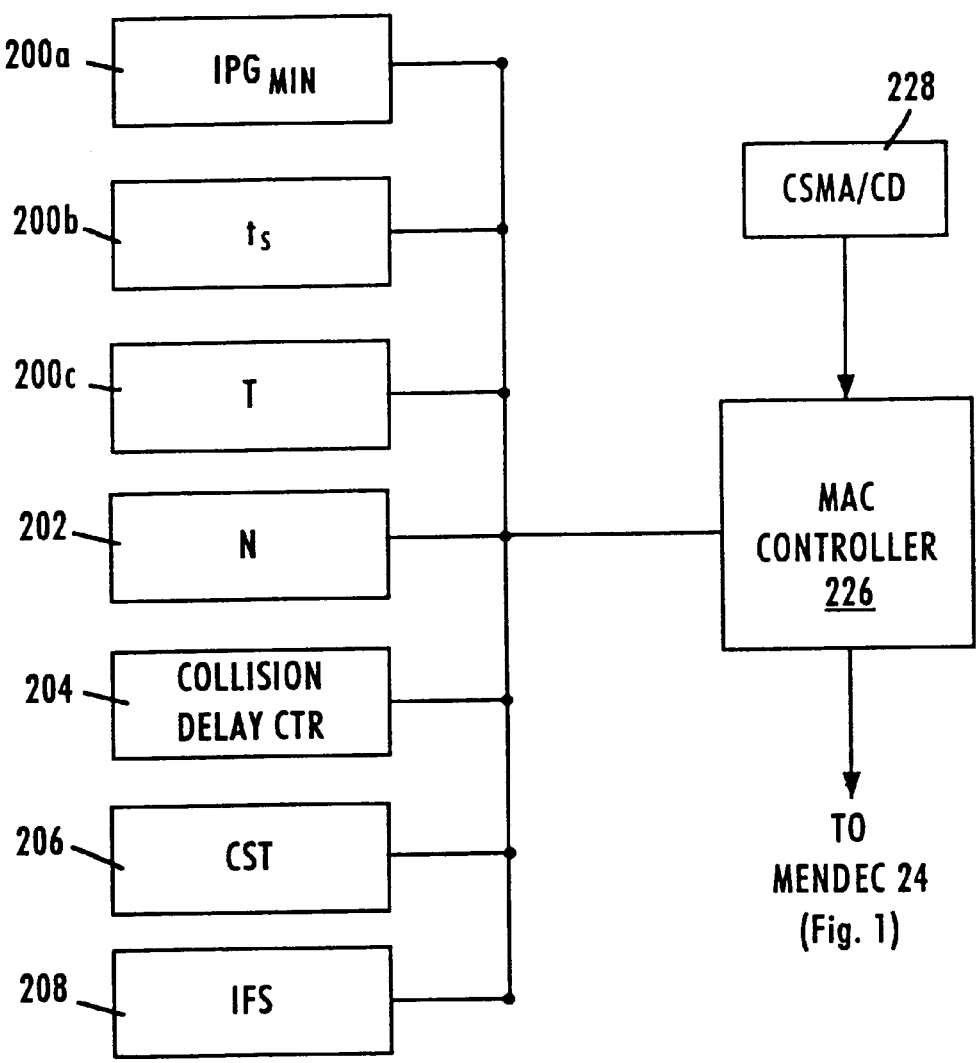
FIG. 3 is a block diagram of the media access control (MAC) of FIG. 1.

FIGS. 2A and 2B are flow diagrams summarizing a method by a network node for accessing the media 50 of an Ethernet network according to an embodiment of the present invention. The network node accessing the media may be a network station, or another device employing a point-to-point communication with the network station (e.g., a MAC port of a network switch). As shown in FIG. 2A, the method begins by the MAC 22 resetting a consecutive station transmit (CST) counter in step 60. The CST counter, shown in FIG. 3, is a consecutive transmission counter configured for counting a number of consecutive transmissions by the MAC 22. As described below, the MAC 22 sets an interpacket gap based on the consecutive station transmission (CST) counter reaching, a prescribed threshold.

After the CST counter is reset in step 60, the MAC 22 monitors the network media 50 to determine the presence of a carrier in step 62, indicating network activity. If the MAC 22 determines the presence of a carrier signal on the network media 50 indicating network activity, the MAC 22 defers to the network activity until deassertion of the carrier sense. Upon deassertion of the carrier sense, the MAC 22 waits an interframe spacing equal to the minimum interpacket gap ($IPG_{MIN}$) in step 64. As recognized in the art, the minimum interpacket gap ($IPG_{MIN}$) is equal to 96 bit times. After waiting the minimum IPG in step 64 following deassertion of the carrier sense in step 62, the MAC 22 transmits a data packet on the media 50 in step 66. According, to the disclosed embodiment, it is assumed that the transmit FIFO 32 always has data for transmission on the network media.

The MAC 22 then determines in step 68 whether a collision is encountered during transmission of the data packet, for example by sensing, whether a collision signal is asserted. If the MAC 22 senses a collision on the network media in step 68 during, the attempted transmission of the data packet in step 66, the MAC 22 performs collision mediation in step 70 according to the truncated binary exponential backoff (TBEB) algorithm specified in IEEE 802.3 protocol. If the MAC 22 determines that collision mediation was not successful in step 70, the MAC 22 returns to step 60 to reset the consecutive counter in response to detecting successful transmission of a data packet on the network media by another network node and to defer to the station having successfully transmitted on the network media.

If in step 70 the MAC 22 determines that collision mediation was successful resulting in a transmitted data packet, the MAC 22 increments the CST counter in step 72. The MAC 22 then checks in step 74 whether the CST counter is greater than or equal to a prescribed threshold (T) specifying a consecutive number of successful transmissions. According to the disclosed embodiment, the value of T is set to 1, to provide an improved variation of the above-described CABEB algorithm, although other threshold values may be used. If in step 74 the MAC 22 determines the CST counter is greater than or equal to the prescribed threshold T identifying, a prescribed number of consecutive successful transmissions, the MAC 22 waits the interframe spacing, equal to the minimum IPG ($IPG_{MIN}$) in step 76 of FIG. 2B.

Assuming the MAC 22 has a consecutive packet to transmit, the MAC 22 transmits the second data packet in step 78 onto the network media 50 after waiting the minimum IPG. The MAC 22 then checks in step 80 whether a collision is encountered during, transmission of the second data packet from step 78. If no collision is encountered, then transmission is completed, the CST counter is incremented, and steps 76 and 78 are repeated to transmit another consecutive packet. However, if the MAC 22 detects a collision in step 80, the MAC 22 performs collision mediation according to the TBEB algorithm in step 82 based on the number of access attempts equal to one. Specifically, since the TBEB algorithm provides a random selection of slot times ($t_s$) from the range $[0, 2^N-1]$, the MAC 22 randomly selects k slot times from the range [0,1] for N→1.

Hence, the MAC 22 randomly selects between zero slot times and one slot time in step 82 as the collision delay interval. As recognized in the art, the MAC 22 does not monitor network activity during the collision backoff interval. Hence, the MAC 22 waits the selected delay interval (k $t_s$) in step 84 without monitoring activity on the network media. The MAC 22 checks in step 86 if the randomly selected integer (k) equals zero. If the integer multiple of slot time equals zero, the MAC 22 sets the interframe spacing in step 88 to equal the minimum IPG ($IPG_{MIN}$) plus 2 slot times. However, if the MAC 22 determines in step 86 that the collision delay interval equals one slot time, the MAC 22 sets the interframe spacing (IFS) equal to the minimum IPG plus 1 slot time in step 90. The MAC 22 then waits the modified interpacket gap interval (i.e., the specified interframe spacing) in step 92 following termination of the collision delay interval in step 84.

The logic of steps 86, 88 and 90 ensure that the combination of the backoff interval plus the selected interframe spacing, causes a total delay following the sensed collision in step 80 of at least two slot times, ensuring that the network station will lose the collision resolution to the other contending station because the interframe spacing is extended accordingly in steps 88 and 90. Hence, the MAC 22 having, consecutive transmission will always defer to another network station contending for access for the media. Hence, the MAC 22, having, waited the modified interpacket gap interval in step 92, will sense network activity by the other contending network stations in step 94, and will reset the collision attempt counter and defer to the contending network stations accordingly.

The deferral based on the collision mediation and extended IFS in step 92 can be illustrated using two nodes (e.g., stations) A and B on a network. Assume that station A has transmitted a packet successfully (e.g., completed steps 66 through 74) and encounters a collision with station B in step 80. Station A, having transmitted a first data packet before the second data packet, will randomly select either 0 or 1 slot time in step 82, and wait the selected collision delay interval in step 84 without monitoring activity on the network media. Similarly, station B will select either 0 or 1 slot time. Station A will then select an interframe spacing, using steps 88 or 90, based on the selected slot time in step 86, and wait the extended interframe spacing in step 92. Station B, however, will wait merely the minimum IPG following at most one slot time.

Hence, four scenarios are possible, where stations A and B can pick slots (0,0), (0,1), (1,0), or (1,1). Regardless of what slot time station A chooses, station A will lose the collision resolution because station A's interpacket gap is extended accordingly. For example, in the case of (0,1) slot time combination, even though station A has 0 slot times, station A has extended its interframe spacing by two slot times. Station B will return from its backoff interval after one slot time and will find the network medium 50 idle since station A will still be deferring. By the end of the second slot time, station A will detect activity on the network media, and will reset its CST counter in step 60, as well as its collision attempt counter (N) and the IFS timer to the minimum IPG.

Assuming, the (0,0) slot time combination, even though stations A and B each have 0 slot times, station A has its interframe spacing extended to two slot times. However, A will detect that there is activity on the medium at the end of the first slot time and will reset its CST counter in step 60 and reset its IPG to the minimum IPG in step 64. The attempt counter (N) for station A is reset as well. It should be noted that if the two-part deferral option is used according to IEEE 802.3, then IFS 1 is set to $IPG_{MIN}$ plus 2 slots, and IFS 2 is set equal to 0.

According to the present invention, a station attempting transmission of a second data packet after having, transmitted a first data packet generates an extended interpacket gap interval upon encountering a collision, ensuring that contending station gains access to the medium, regardless of the outcome of collision mediation. Hence, capture effect is avoided without adversely affecting small packet performance. Moreover, the disclosed arrangement improves network throughput and efficiency by minimizing, the number of collisions on the network medium. For example, use of the conventional TBEB algorithm may result in repeated collisions during collision mediation. According to the disclosed embodiment, however, a contending station will encounter only one collision at a time.

FIG. 3 is a block diagram illustrating the functional components of the MAC 22. The media access control 22 includes a plurality of registers 200 for storing timing values and threshold values as described in the above figures. The MAC 22 also includes counters and timers, for example a collision counter 202 for storing the number of access attempts (N), a programmable collision delay timer 204 that counts the determined collision delay interval, a consecutive station transmission (CST) counter 206, configured for counting a number of consecutive transmissions by the MAC 22, and an interframe spacing timer configured for counting an interframe spacing, of at least the minimum interpacket gap interval ($IPG_{MIN}$) following either deassertion of the carrier signal or expiration of the collision delay timer 204. The MAC 22 also includes a controller 226 and a carrier sense multiple access/collision detection (CSMA/CD) portion 228. The values of the minimum IPG ($IPG_{MIN}$), a slot time ($t_s$) stored in resisters 200a and 200b are preloaded in a non-volatile memory element. The register 200c storing the threshold (T) may be preprogrammed, or may be set by a user.

The MAC controller 226 is configured for attempting access of the media following expiration of the IFS timer 228. The media access device also sets the interframe spacing, as described above, with respect to steps 88 and 90, based upon the selected slot time interval in step 82.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

I claim:

1. A method of accessing network media by a network node, comprising:

transmitting a first data packet on the network media;

following transmitting of the first data packet, attempting transmission of a second data packet as a consecutive transmission;

sensing a collision on the network media during the attempted transmission of the second data packet;

randomly waiting one of zero and one slot times as a collision backoff interval in response to the sensed collision; and waiting a modified interpacket gap interval following, the collision backoff interval, the modified interpacket gap interval based on the collision backoff interval and causing a total delay following the sensed collision of at least two slot times.

2. The method of claim 1, wherein the modified interpacket gap waiting step comprises:

setting the modified interpacket gap interval to equal a prescribed minimum interpacket gap interval plus two slot times if the collision backoff interval equals zero slot times; and setting the modified interpacket gap interval to equal the prescribed minimum interpacket gap interval plus one slot time if the collision backoff interval equals one slot time.

3. The method of claim 2, further comprising:

determining the presence of a carrier signal on the network media during the modified interpacket gap waiting step;

deferring transmission of the second data packet in response to the presence of the carrier signal; and transmitting the second data packet after the modified interpacket gap waiting step if the carrier signal is not present during the modified interpacket gap waiting step.

4. The method of claim 1, further comprising:

incrementing a consecutive transmit counter in response to transmitting the first data packet;

comparing the consecutive transmit counter to a prescribed threshold;

wherein the modified interpacket gap interval includes setting the modified interpacket gap interval in response to the comparing step.

5. The method of claim 4, further comprising resetting the consecutive transmit counter in response to detecting successful transmission of a data packet on the network media by another network node.

6. A method of accessing network media by a network node, comprising:

counting a number of consecutive transmissions of data packets on the network media by the network node;

waiting an interframe spacing having at least a minimum interpacket gap interval following each data packet transmission sensing a collision on the network media during an attempted transmission of another consecutive data packet;

randomly selecting one of zero and one slot times as a collision backoff interval in response to the sensed collision; and increasing the interframe spacing following the collision backoff interval by a number of slot times based on the number of selected slot times and the number of consecutive transmissions of data packets.

7. The method of claim 6, wherein the increasing step comprises:

setting the interframe spacing to equal a prescribed minimum interpacket gap interval plus two slot times if the randomly selecting step selects zero slot times as the collision backoff interval; and setting the interframe spacing to equal the prescribed minimum interpacket gap interval plus one slot time if the randomly selecting step selects one slot time as the collision backoff interval.

8. The method of claim 6, further comprising:

waiting the collision backoff interval after sensing the collision without monitoring activity on the network media; and waiting the interframe spacing, after the collision backoff interval; and monitoring the activity on the network media during at least a portion of the interframe spacing waiting, step.

9. A method of accessing network media by a network node, comprising:

attempting transmission of a second data packet a predetermined interpacket gap interval after having transmitted a first data packet;

detecting a collision during the attempted transmission of the second data packet;

selectively waiting one slot time without monitoring an activity on the network media in response to the detected collision; and selecting an interframe spacing, having a time interval of at least the predetermined interpacket gap interval plus one slot time based on the selectively waiting step for monitoring the activity on the network media during at least a portion of the interframe spacing.

10. The method of claim 9, further comprising monitoring the activity on the network media during said at least the portion of the interframe spacing.

11. The method of claim 10, wherein the selecting step comprises selecting the interframe spacing to equal at least the predetermined interpacket gap interval plus two slot times if the selectively waiting step selects zero slot times.

12. The method of claim 10, further comprising resetting a collision attempt counter in response to detecting said activity on the network media during the at least the portion of said interframe spacing.

13. A network interface for connection with network media, comprising:

a carrier and collision sensor configured for sensing a carrier signal and a collision signal;

a collision timer configured for selectively counting one of zero and one slot times as a collision delay interval in response to the sensed collision signal;

at least one interframe spacing timer for counting an interframe spacing of at least a minimum interpacket gap interval following one of deassertion of the carrier signal and expiration of the collision timer; and a media access controller configured for attempting access of the media following expiration of the interframe spacing timer, the media access controller setting the interframe spacing to at least the minimum interpacket gap interval plus a slot time in response to the collision timer selecting one slot time in response to a collision of a second data packet transmitted consecutively after a first data packet by the media access controller.

14. The interface of claim 13, wherein the media access controller sets the interframe spacing to at least the minimum interpacket gap interval plus two slot times in response to the collision timer selecting zero slot times in response to said collision of the second data packet.

15. The interface of claim 14, further comprising a consecutive transmission counter configured for counting a number of consecutive transmissions by the media access controller, the media access controller setting the interframe spacing to at least the minimum interpacket gap interval plus the slot time in response to the consecutive transmission counter reaching a prescribed threshold.

16. The interface of claim 15, wherein the prescribed threshold equals one.

* * * * *